(12) United States Patent
Twardzik

(10) Patent No.: US 9,832,823 B2
(45) Date of Patent: Nov. 28, 2017

(54) LOAD DRIVING CIRCUIT AND ILLUMINATION APPARATUS INCLUDING THE SAME

(71) Applicant: OSRAM GmbH, Munich (DE)

(72) Inventor: Rene Twardzik, Traunreut (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/915,292

(22) PCT Filed: Jul. 10, 2014

(86) PCT No.: PCT/EP2014/064835
§ 371 (c)(1),
(2) Date: Feb. 29, 2016

(87) PCT Pub. No.: WO2015/028189
PCT Pub. Date: Mar. 5, 2015

(65) Prior Publication Data
US 2016/0219659 A1    Jul. 28, 2016

(30) Foreign Application Priority Data

Aug. 30, 2013  (CN) .......................... 2013 1 0388596

(51) Int. Cl.
*H05B 33/08* (2006.01)
*H02M 3/156* (2006.01)
(Continued)

(52) U.S. Cl.
CPC ........ *H05B 33/0815* (2013.01); *H02M 3/156* (2013.01); *H02M 7/217* (2013.01);
(Continued)

(58) Field of Classification Search
None
See application file for complete search history.

(56) References Cited

U.S. PATENT DOCUMENTS 5,734,562 A  *  3/1998  Redl .................... H02M 1/4208
                                                           323/222
6,515,883 B2     2/2003  Wade
(Continued)

FOREIGN PATENT DOCUMENTS

CN        1352486 A      6/2002
CN      101835314 A      9/2010
(Continued)

OTHER PUBLICATIONS

International Search Report based on application No. PCT/EP2014/064835 (3 pages) dated Oct. 30, 2014 (for reference purpose only).
(Continued)

*Primary Examiner* — Jany Richardson
(74) *Attorney, Agent, or Firm* — Viering, Jentschura & Partner mbB

(57) ABSTRACT

Various embodiments may relate to a load driving circuit and an illumination apparatus including the same. The load driving circuit includes a Single-Ended Primary Inductor Converter (SEPIC) converter adapted to convert an input system voltage into a DC output voltage, and a BUCK converter 200 adapted to regulate a current and provide the regulated current to a load. The load driving circuit further includes a first diode and a second diode which are connected so that the SEPIC converter and the BUCK converter share one switch. According to various embodiments, it is possible to obtain constant current output characteristics and high power factor with a simple circuit structure and a low cost.

10 Claims, 2 Drawing Sheets

(51) Int. Cl.
*H02M 7/217* (2006.01)
*H02M 3/155* (2006.01)

(52) U.S. Cl.
CPC ..... *H05B 33/0818* (2013.01); *H05B 33/0845* (2013.01); *H02M 2003/1557* (2013.01); *Y02B 20/347* (2013.01)

(56) References Cited

U.S. PATENT DOCUMENTS

| | | | |
|---|---|---|---|
| 2002/0181262 A1 | 12/2002 | Wade | |
| 2009/0174376 A1* | 7/2009 | Barthold | H02M 3/155 323/272 |
| 2011/0285301 A1 | 11/2011 | Kuang et al. | |
| 2014/0300274 A1* | 10/2014 | Acatrinei | H05B 33/0815 315/85 |

FOREIGN PATENT DOCUMENTS

| | | |
|---|---|---|
| CN | 101952786 A | 1/2011 |
| CN | 101958660 A | 1/2011 |
| CN | 101958660 B | 1/2013 |
| CN | 102946188 A | 2/2013 |
| EP | 2385747 A2 | 11/2011 |
| WO | 2009073078 A1 | 6/2009 |
| WO | 2013090945 A1 | 6/2013 |

OTHER PUBLICATIONS

Chinese Office Action based on application No. 201310388596.2 (6 pages and 9 pages of English translation) dated Aug. 24, 2017 (Reference Purpose Only).

\* cited by examiner

LOAD DRIVING CIRCUIT AND ILLUMINATION APPARATUS INCLUDING THE SAME

RELATED APPLICATIONS

The present application is a national stage entry according to 35 U.S.C. §371 of PCT application No.: PCT/EP2014/064835 filed on Jul. 10, 2014, which claims priority from Chinese application No.: 201310388596.2 filed on Aug. 30, 2013, and is incorporated herein by reference in its entirety.

TECHNICAL FIELD

Various embodiments may relate to a load driving circuit and an illumination apparatus including the same, and more particularly, to a load driving circuit which is capable of providing a stable current to a load and has a high power factor with a simple and low cost circuit structure, and an illumination apparatus including the same.

BACKGROUND

In solid state lighting (SSL) applications, a circuit is generally powered by a main line voltage. Therefore, a power converter between the main line voltage as a power source and the load is commonly required to satisfy the following specifications: (1) a power factor correction is required so as to ensure the power factor of the circuit close to 1 and to enable the harmonics to satisfy a local standard limit; (2) a current through the load (e.g., a string of light emitting diodes (LEDs)) should be a stable direct current (DC); (3) the output is protected from being short-circuit so as to ensure safe operation of the load; and (4) the output is optionally galvanically isolated.

Currently, the power converter satisfying the constant current output characteristics and including active power factor correction is generally designed as a two-stage structure, converters at the two stages having different functions respectively. However, in the relate art, since more switch devices and switch driving circuits are required for such a two-stage circuit arrangement, complexity and cost of the circuit are greatly increased.

SUMMARY

Various embodiments provide a load driving circuit which is capable of achieving constant current output characteristics and high power factor and low harmonics with a simple circuit structure and an illumination apparatus including the same, in which two well-known converter structures are combined in such a way that one switch device is shared between the converter circuits at two stages, thereby greatly simplifying the structure of the load driving circuit and reducing the cost. Further, since the circuits at two stages share one switch device, number of the switch driving circuits can also be reduced, simplifying switch control logic, thereby further simplifying the circuit structure.

According to an embodiment of the present disclosure, there is provided a load driving circuit, including: a Single-Ended Primary Inductor Converter (SEPIC) converter adapted to convert an input system voltage into a direct current output voltage; and a BUCK converter adapted to regulate a current and provide the regulated current to a load, in which the load driving circuit further includes a first diode and a second diode which are connected so that the SEPIC converter and the BUCK converter share one switch.

According to another embodiment of the present disclosure, there is further provided an illumination apparatus including the load driving circuit described above and a string of LEDs including one or more LEDs.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
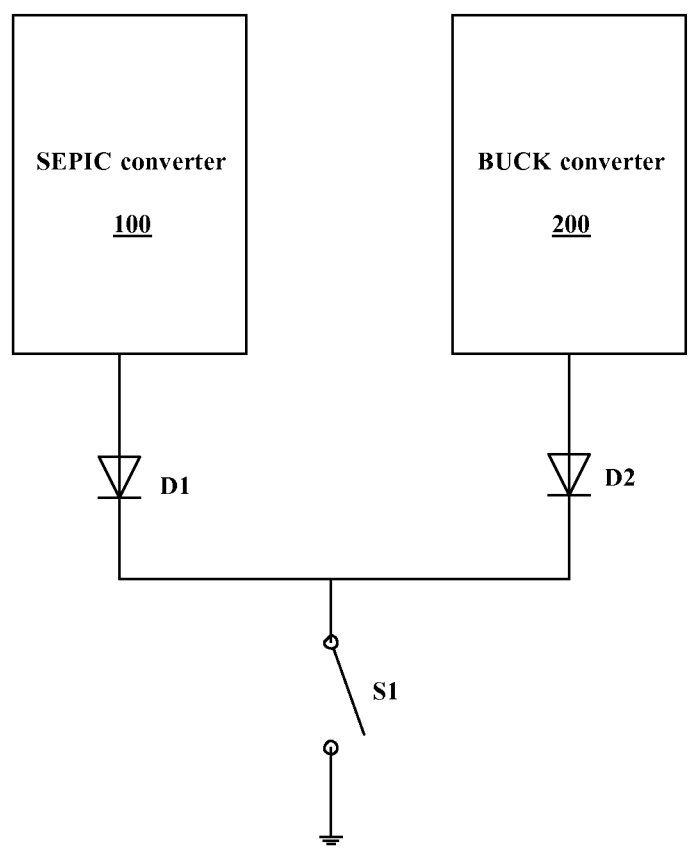
FIG. 1 illustrates a schematic block diagram of a load driving circuit according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures closely relevant to the solutions of the invention are illustrated in the drawings while other details less relevant to the invention are omitted so as not to obscure the invention due to those unnecessary details.

Currently, the load driving circuit with a two-stage structure has been applied widely, in which a rectified system voltage is input into a first stage, and the DC voltage processed by the first stage which is usually referred as an intermediate circuit voltage is input into a second stage. Moreover, the first stage also has a function of obtaining from the system voltage a system current being approximately proportional to the system voltage, that is, making the current be in-phase with the voltage, thus the circuit may have a high power factor. The second stage may be a DC/AC converting circuit (i.e., an inverter) or a DC/DC converter (such as a BUCK converter or the like), which generates an output suitable to different load characteristics using the intermediate circuit voltage.

For the first stage, a SEPIC converter is generally used which only includes one switch device and has the following advantages: the input voltage (DC or AC) may be converted into an almost constant DC output voltage which may be higher or lower than the input voltage as required; and a simple control logic (for example, a constant switching frequency and a constant duty cycle) may be required for the switch device so as to ensure the current is proportional to the voltage to some extent, so that the circuit has a high power factor and the harmonics in the circuit is reduced.

For the second stage, different switching circuits such as the inverter or the BUCK converter and the like may be selected in accordance with the actual load characteristics. In a case that the load is LED, in order to protect the LED from flickering, it is required that the current provided to the load is a constant current, while the BUCK converter can provide the load with constant current by adopting a regulating circuit.

Examples of the load driving circuit according to the embodiment of the present disclosure will be described with reference to FIGS. 1 and 2 below.

As shown in FIG. 1, the load driving circuit according to the embodiment of the present disclosure may include: a SEPIC converter 100 adapted to convert an input system voltage into a DC output voltage; and a BUCK converter 200 adapted to regulate a current and provide the regulated current to a load. Preferably, the input system voltage may be a DC voltage or an AC voltage, since the SEPIC converter 100 may be appropriately configured to function as a DC/DC converter or an AC/DC converter.

Further, the load driving circuit may further include a first diode D1 and a second diode D2 which are connected so that one switch S1 may be shared between the SEPIC converter 100 and the BUCK converter 200. The switch S1 may be an Insulated Gate Bipolar Transistor (IGBT) or a Metal Oxide Semiconductor Field Effect Transistor (MOSFET) and the like, and there is no limitation on this in the present disclosure.

Next, a configuration example of the load driving circuit according to the embodiment of the present disclosure will be described in detail with reference to FIG. 2.

First, a structure of the SEPIC converter 100 will be described in detail.

Figure 2:
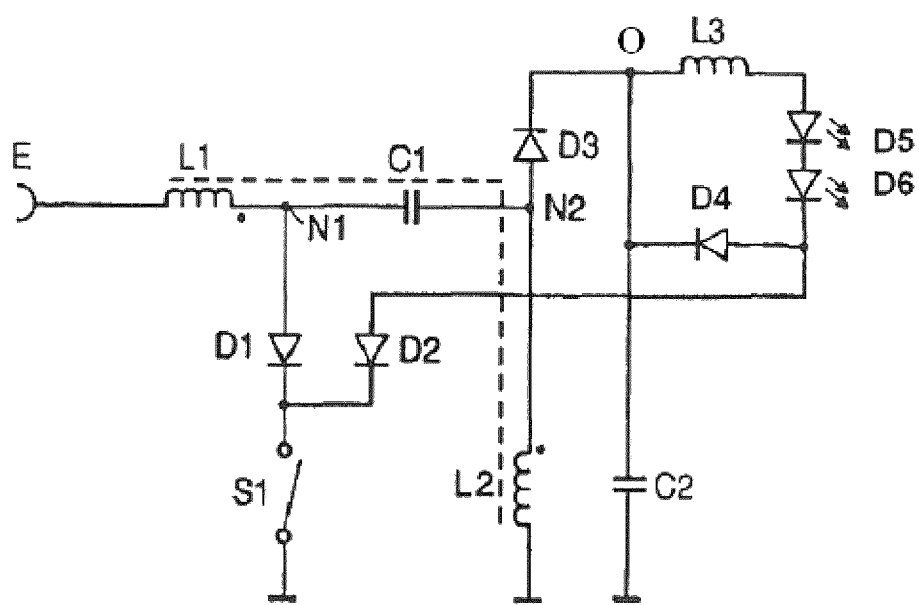
FIG. 2 illustrates a circuit diagram of an example configuration of the load driving circuit according to the embodiment of the present disclosure.

As shown in FIG. 2, the SEPTIC converter 100 may include an input terminal E, an input inductor L1, a switch S1, a first capacitor C1 and a second inductor L2.

The input terminal E is referred to the ground potential and is used to input the system voltage. Preferably, the input system voltage may be a rectified sinusoidal voltage. The input inductor L1 is connected between the input terminal E and a first node N1. The first contact of the switch S1 is connected to the cathodes of the first diode D1 and the second diode D2, and the second contact thereof is connected to the ground potential. The first capacitor C1 is connected between the first node N1 and a second node N2, which can provide galvanic isolation between the input and the output and also can provide short-circuit-proof for the load. The second inductor L2 is connected between the second node N2 and the ground potential. The inductors L1 and L2 may be coupled, as shown by the dashed line in FIG. 2, so that a ripple current compensation for the input current may be performed.

Further, an anode of the first diode D1 is connected to the first node N1 so that the current flows from the input inductor L1 to the switch S1, and an anode of the second diode D2 is connected to the load so that the current flows from the load to the switch S1. Such connection manner of the diodes D1 and D2 ensures that the switch S1 can be simultaneously used both in the circuit at the preceding stage and the circuit at the succeeding stage without affecting respective functions of the circuits at the two stages.

Preferably, the SEPIC converter may further include a third diode D3 and a second capacitor C2. The third diode D3 is connected between the second node N2 and an output terminal O of the SEPIC converter, and the second capacitor is connected between the output terminal O and the ground potential.

Next, the structure of the BUCK converter will be described in detail.

The BUCK converter may include the switch S1, a third inductor L3, a fourth diode D4 and the second capacitor C2. One end of the third inductor L3 and the cathode of the fourth diode D4 are connected to the output terminal O, and the load is connected between the other end of the third inductor L3 and the anode of the fourth diode D4.

Hereinafter, the operating process of the load driving circuit will be described in detail according to the circuit configuration described with reference to FIG. 2 above.

It is well-known to those skilled in the art that the inductor has a property of keeping the current constant and the capacitor has a property of keeping the voltage constant. Therefore, when the switch S1 closes, a loop constituted by the input terminal E, the inductor L1, the diode D1 and the switch S1, a loop constituted by the capacitor C1, the diode D2, the switch S1 and the inductor L2 and a loop constituted by the capacitor C2, the inductor L3, the LEDs D5 and D6, the diode D2 and the switch S1 conduct current concurrently. At this time, the electric energy input from the input terminal E passes through the loop constituted by the inductor L1, the diode D1 and the switch S1, and the inductor L1 stores energy, while the energy stored in the capacitor C1 transfers to the inductor L2. The energy stored in the capacitor C2 transfers to the inductor L3 and powers the LEDs D5 and D6 simultaneously.

When the switch S1 switches off, a loop constituted by the input terminal E, the inductor L1, the capacitor C1, the diode D3, the inductor L3, the LEDs D5 and D6, the diode D4 and the capacitor C2 and a loop constituted by the inductor L2, the diode D3, the inductor L3, the LEDs D5 and D6, the diode D4 and the capacitor C2 conduct current simultaneously. At this time, the electric energy input from the input terminal E and the electric energy stored in the inductors L1, L2 and L3 power the load together, and meanwhile the capacitors C1 and C2 stores energy.

As can be seen from the above operating principles, the magnitude of the voltage at the output terminal O of the SEPIC converter (that is, the voltage applied across the load) depends on the switching frequency and duty cycle of the switch S1, and may be higher or lower than the voltage input from the input terminal E as required. Preferably, the control methods for the switch S1 may include the constant switching frequency control and the constant duty cycle control. For the SEPIC converter, an almost constant output voltage may be obtained only with simple control logic, and it is also possible to make the current be proportional to the voltage approximately, thus greatly improving the power factor and reducing the harmonics of the circuit.

Further, the BUCK converter at the succeeding stage may regulate the current so as to provide the substantially constant current to the load. In a case of illumination application, the lighting device is avoided from flickering so as to provide a better illumination effect for the user. The magnitude of the current regulated by the BUCK converter depends on the switching frequency and duty cycle of the switch S1.

For example, in a control scheme with a constant switching frequency and a variable duty cycle, when the on-time of the switch S1 decreases (that is, when the duty cycle decreases), the voltage at the output terminal O of the SEPIC converter will decrease, and simultaneously, the BUCK converter decreases the current through the load; while the on-time of the switch S1 increases (that is, when the duty cycle increases), the voltage at the output terminal O of the SEPIC converter will increase, and simultaneously, the BUCK converter increases the current through the load.

Further, for the existing circuit arrangement with a constant output voltage, the load current can not be regulated directly through adjustment of the output voltage generally, while for the combination configuration of the SEPIC converter and the BUCK converter according the embodiment of the present disclosure, the load current may be regulated directly by switching the on- and off-state of the switch S1.

Specifically, when the switch S1 closes, the loop constituted by the capacitor C2 as the power source, the inductor L3 as a current limiting part, the LEDs D5 and D6, the diode D2 and the switch S1 conducts current, and the current flowing through the loads D5 and D6 increases at this time; and when the switch S1 switches off, the current is forced into a freewheeling loop constituted by the inductor L3, the LEDs D5 and D6 and the diode D4, thus the current flowing through the loads D5 and D6 decreases. Therefore, the load current can be regulated directly by controlling on and off of the switch S1.

As can be seen from above, since the SEPIC converter and the BUCK converter have complementary regulation characteristics, it is possible to share one switch device therebetween. Further, the diode D1 is connected between the switch S1 and the SEPIC converter, and the diode D2 is connected between the switch S1 and the BUCK converter, thus it is possible to prevent the circuits at the preceding and succeeding stages from influencing each other, thus to ensure respective functions and advantages of the SEPIC converter and the BUCK converter.

According to the above embodiments, by sharing one switch device between the SEPIC converter and the BUCK converter, a desired effect can be achieved with a simple circuit structure and low cost, that is, a high power factor, low harmonics, stable output current and short-circuit-proof and galvanic isolation for the output.

According to another embodiment of the present disclosure, there is further provided an illumination apparatus including the load driving circuit described above and a string of LEDs. A stable and efficient illumination effect can be provided by using the above load driving circuit in the illumination apparatus, thereby improving the user's experience.

Although specific implementation of the load driving circuit according to the preferred embodiment of the present disclosure has been described above in combination with FIG. 2, it is to be understood that the circuit structure as shown in FIG. 2 and electronic components used in this circuit are only exemplary without limitation, and those skilled in the art may make various variations and alternations to the above circuit structure according to the principles taught by the invention as required.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A load driving circuit comprising:
a Single-Ended Primary Inductor Converter (SEPIC) converter adapted to convert an input system voltage into a DC output voltage; and
a BUCK converter adapted to regulate a current and provide the regulated current to a load,
wherein the load driving circuit further comprises a first diode and a second diode which are connected so that the SEPIC converter and the BUCK converter share one switch;
wherein the BUCK convertor comprises:
the switch;
a third inductor;
a fourth diode; and
a second capacitor,
wherein one end of the third inductor and one end of the fourth diode are connected to an output terminal, and the load is connected between the other end of the third inductor and the other end of the fourth diode.

2. The load driving circuit according to claim 1, wherein the SEPIC converter comprises:
an input terminal referred to a ground potential and used for inputting the system voltage;
an input inductor connected between the input terminal and a first node;
the switch, a first contact of which being connected to cathodes of the first diode and the second diode, and a second contact of which being connected to the ground potential;
a first capacitor connected between the first node and a second node; and
a second inductor connected between the second node and the ground potential,
wherein an anode of the first diode is connected to the first node so that a current flows from the first inductor to the switch, and an anode of the second diode is connected to the load so that a current flows from the load to the switch.

3. The load driving circuit according to claim 2, wherein the SEPIC converter further comprises:
a third diode connected between the second node and an output terminal of the SEPIC converter; and
a second capacitor connected between the output terminal and the ground potential.

4. The load driving circuit according to claim 1, wherein the system voltage is a rectified voltage.

5. The load driving circuit according to claim 1, wherein a magnitude of the DC output voltage depends on a switching frequency and a duty cycle of the switch.

6. The load driving circuit according to claim 1, wherein a magnitude of the regulated current depends on a switching frequency and a duty cycle of the switch.

7. The load driving circuit according to claim 1, wherein a control method for the switch comprises a constant switching frequency control and a constant duty cycle control.

8. The load driving circuit according to claim 1, wherein the load is a string of LEDs comprising one or more LEDs.

9. An illumination apparatus comprising:
a load driving circuit; and
a string of LEDs comprising one or more LEDs,
the load driving circuit, comprising:
a Single-Ended Primary Inductor Converter (SEPIC) converter adapted to convert an input system voltage into a DC output voltage; and
a BUCK converter adapted to regulate a current and provide the regulated current to a load,
wherein the load driving circuit further comprises a first diode and a second diode which are connected so that the SEPIC converter and the BUCK converter share one switch;

wherein the BUCK convertor comprises:
the switch;
a third inductor;
a fourth diode; and
a second capacitor,
wherein one end of the third inductor and one end of the fourth diode are connected to an output terminal, and the load is connected between the other end of the third inductor and the other end of the fourth diode.

10. A load driving circuit comprising:
a Single-Ended Primary Inductor Converter (SEPIC) converter adapted to convert an input system voltage into a DC output voltage; and
a BUCK converter adapted to regulate a current and provide the regulated current to a load,
wherein the load driving circuit further comprises a first diode and a second diode which are connected so that the SEPIC converter and the BUCK converter share one switch;
wherein the SEPIC converter comprises:
an input terminal referred to a ground potential and used for inputting the system voltage;
an input inductor connected between the input terminal and a first node;
the switch, a first contact of which being connected to cathodes of the first diode and the second diode, and a second contact of which being connected to the ground potential;
a first capacitor connected between the first node and a second node;
a second inductor connected between the second node and the ground potential,
wherein an anode of the first diode is connected to the first node so that a current flows from the first inductor to the switch, and an anode of the second diode is connected to the load so that a current flows from the load to the switch a third diode connected between the second node and an output terminal of the SEPIC converter; and
a second capacitor connected between the output terminal and the ground potential.

* * * * *